3,632,680
CROSS-LINKED POLYOLEFIN COMPOSITIONS
George H. Hunt, West Newton, and Jonathan R. Learn, Hingham, Mass., assignors to Simplex Wire and Cable Company
No Drawing. Filed Mar. 20, 1968, Ser. No. 714,461
Int. Cl. C08f 45/60
U.S. Cl. 260—878
2 Claims

ABSTRACT OF THE DISCLOSURE

A composition is disclosed comprising 100 parts of a polyolefin base material, e.g., polyethylene, 0.2 to 20 parts of divinyl benzene, 1 to 10 parts of an organic peroxide cross-linking agent, e.g., dicumyl peroxide or other mono- or polyfunctional saturated or unsaturated organic peroxide, and 0.1 to 10 parts of a high voltage stabilizing additive.

BACKGROUND OF THE INVENTION

(1) Field of the invention

This invention relates to cross-linked polyolefin compositions and in particular to such compositions having additives which improve the voltage stability thereof.

(2) Description of the prior art

Cross-linked polyolefin compositions and in particular cross-linked polyethylene is well known in the art, the principal cross-linking agents being organic peroxide containing compounds, preferably a tertiary peroxide such as di(alpha-cumyl) peroxide. While cross-linked polyolefin compositions containing organic peroxides have been produced in indefinite lengths, e.g., for electrical insulating materials, such production is restricted by a relatively slow rate of cure. Moreover, voltage stabilizing additives to polyethylene, which enhance the high voltage stability of the polyethylene compositions, have been observed to inhibit the rate of cross-linking and, therefore, commercial production of cross-linked, voltage stabilized polyolefin compositions has not been practical.

SUMMARY OF THE INVENTION

It has now been found that the cross-linking of mixtures containing organic peroxides and polyolefins, and especially mixtures which also contain voltage stabilizing additives, is enhanced by the addition thereto of divinyl benzene. This invention, therefore, encompasses compositions and the method of making compositions which are cross-linked polyolefins containing organic peroxide cross-linking agents and divinyl benzene, and in particular applies to such compositions which also contain high voltage stabilizing additives such as those described in the following patents and applications:

Hunt, Pat. No. 3,346,500
Gross et al., Pat. No. 3,350,312
Heidt application Ser. No. 372,301 (now abandoned) (filed June 3, 1964)
Hunt application Ser. No. 649,355 (filed June 27, 1967) (now Pat. No. 3,445,394).

Divinyl benzene has certain characteristics by reason of which it is a particularly desirable component in the compositions of this invention. Since it is a relatively low viscosity liquid, it can be added to commercially available cross-linkable polymer compositions (i.e., granules of polyolefin containing organic peroxides) at room temperature. The low volatility of divinyl benzene simplifies handling of the compositions prior to curing. Finally, the divinyl benzene is essentially non-polar and therefore does not adversely affect the electrical properties of the high voltage stabilized polyolefin.

Polyethylene is the principal polyolefin base material used in the practice of the present invention; low density, medium density and high density polyethylene compositions can be used. Other polyolefins to which the present invention is applicable include polypropylene and ethylene propylene rubber. The formation of these compositions and their handling and mixture with organic peroxides is well known in the art and polymer compositions containing organic peroxides, available as cross-linkable compositions, are a preferred starting material in the process of this invention.

Our invention is useful in connection with substantially all organic peroxide cross-linking agents including mono- and poly-functional peroxides and saturated and unsaturated peroxides. These include benzoyl peroxide,
di(alpha-cumyl) peroxide,
2,5-bis(tertiary amylperoxy)-2,5-dimethylhexane,
2,5-bis(tertiary butyl peroxy)-2,5-dimethylhexyne-3,
tertiary butyl perbenzoate,
2,5-bis(tertiary-butylperoxy)-,2,5-dimethylhexane,
1,1'-ethylenebis[(1-tertiary-amylperoxy)cyclohexane],
2,5-bis(tertiary-butylperoxy)-2,5-diphenylhexane,
2,5-bis(tertiary-butylperoxy)-2,5-dicyclohexylhexane,
2,5-bis(tertiary-butylperoxy)-2,5-dibenzylhexane,
2,5-bis(2,5-dimethyl-2-hexylperoxy)-2,5-dimethylhexane.

The high voltage stabilizing additives include mono- or poly-aromatic hydrocarbons such as 2-bromonapthalene, 4-4' dibromobiphenyl or mixed polyhalogenated biphenyls. Also included are 2,4,6-trinitrotoluene, 2,4-dinitrotoluene, 2,6-dinitrotoluene, 2-nitrodiphenylamine, 2,4-dinitrodiphenylamine, o-nitroanisole, o-nitrobiphenyl, 2-nitroaniline, anthranilonitrile, 1-fluoro-2-nitrobenzene, diparamethoxy diphenylamine, o-nitrotoluene, chloranil and 2,6-dinitroaniline, mixtures thereof, mixtures thereof with diphenylamine, and mixtures of diphenylamine with at least one of m-dinitrobenzene, m-nitroaniline, p-nitroaniline, m-nitrotoluene, p-nitrotoluene, o-nitrochlorobenzene, p-nitrochlorobenzene, o-nitroaniline, o-nitrotoluene and 2,4-dinitroaniline. These compounds can be added directly to the polyethylene or they can be dissolved first in an aromatic hydrocarbon oil and the solution added to polyethylene.

The incorporation of the above additives into a polyolefin base improves the electrical properties of the base material especially its high voltage stability. However, the presence of these high voltage stabilizing additives decreases the rate of cure of cross-linkable polyolefin mixes containing organic peroxides as curing agents so that commercial production is impractical if not impossible. The addition of divinyl benzene according to this invention to mixes containing polyolefin voltage stabilizing additives and organic peroxide cross-linking agents provides a greatly increased rate of cure which is accompanied by no diminution of the voltage stabilizing properties of the olefin additives.

Typical compositions according to our invention contain 100 parts of polyolefin base material, 0.2 to 20 parts of divinyl benzene, 1 to 10 parts organic peroxide and 0.1 to 10 parts of high voltage stabilizing additive. These compositions can also include other materials commonly found in cross-linked polyolefins including oxidation inhibitors, adjuvants and fillers such as carbon black, silica, alumina, calcium silicate and clay.

Our compositions can be produced using conventional mixing and blending techniques. A granular polyolefin and organic peroxide mixture is prepared, e.g., by blending in a hot mill. To this mixture the divinyl benzene and high voltage stabilizing additives are added at room temperature and blended in a conventional mixer. It is preferred to add the high voltage stabilizing additives in liquid form and to this end those additives which are normally solid can be dissolved in an aromatic oil or in another additive which is normally liquid, e.g., o-nitrotoluene. Once the composition is completely mixed it can be extruded and cured.

Our compositions are cured in steam at temperatures of 275° F. to 450° F. or preferably are cured in a liquid medium at 270° F. to 600° F. according to the description of co-pending application of Jenkins, Ser. No. 696,944, filed Jan. 10, 1968, the disclosure of which is incorporated herein by reference.

In the liquid cure the extruded polyolefin composition is passed first through a liquid heating bath containing a heat stable liquid, e.g., a polyalkylene glycol, and then through a liquid cooling bath. Normally, the same liquid is used in both the heating and cooling bath. The heating bath is maintained at a temperature of between 300° F. and 600° F. and a small positive pressure between 5 and 100 p.s.i.g. The rate of passage through the heating bath is such as to provide a residence time of up to three minutes and preferably less than one minute.

The degree of cross-linking of the compositions of our invention have been determined according to the test procedure described in "Stress-Strain Apparatus for Vulcanizable Elastomers" by G. H. Hunt and J. R. Learn, IEEE Paper 32C 79–18. By this method, the stress in a sample is measured at a pre-determined elongation, 100 percent, after immersion for a specified time (typically 60 seconds) at a specified temperature, e.g., 121° C., in a liquid medium. These tests were carried out using the polymer, peroxide, divinyl benzene, and stabilizing additive compositions in pressed sheets 0.070 inch to 0.090 inch thick from which dumbbell specimens were cut using an ASTM D412–64T Die D.

The test method used herein, based upon the stress modulus at 100 percent elongation, has been acknowledged to be a reliable basis for determining the degree of cross-linking or cure. See, e.g., "Rubber Chemistry and Technology," page 439, vol. XXV, 1952.

The tests reported herein are mainly based upon curing of the polyethylene base composition at the relatively low temperatures of 320° F. or 350° F. in order to provide information on the rate of cure over an extended period of time. In actual production it is intended to use a relatively higher temperature, e.g., at least about 400° F. to 450° F.; it has been determined that the degree of cure at the higher temperature, which is maintained for about one to two minutes, is roughly equivalent to the degree of cure attained at 320° F. in about 15 to 20 minutes.

Our invention is further described by reference to the following examples:

EXAMPLES 1–6

Six polyethylene based compositions were prepared using a polyethylene base identified as HFDB 4201, a cross-linkable polyethylene sold commercially by Union Carbide and comprising a low density polyethylene containing 2 to 3 parts per 100 of di(alpha-cumyl) peroxide crosslinking agent. The make up of each composition is shown in Table 1 below. The compositions were mixed in a conventional blender and cured at 320° F., samples being extracted at timed intervals and tested to determine the stress modulus at 100 percent elongation. The test results are also shown in Table 1.

The six samples were further tested after a 20 minute cure time for dielectric strength using the needle test described in "An Accelerated Screening Test For Polyethylene High Voltage Insulation," AIEE Transaction Papers No. 62–54 (1962), by D. W. Kitchin and O. S. Pratt. In this test a "standard defect" is used to determine the relative dielectric strength and to indicate the probable voltage life of the polyethylene insulation by inspecting for "trees," a characteristic generally accepted as an early stage of dielectric breakdown.

The "standard defect" consists of a needle imbedded in a sample block under controlled conditions. The blocks are then mounted so that the points of the needles are always the same distance, 2⅞ inches unless otherwise indicated, from a ground plane electrode and each sample is stressed by applying a voltage between the needle and ground for one hour. Each sample is inspected under a microscope at 25× for detectable "trees" as evidence of electrical failure. The results of these tests are shown in Table 1 as the number of samples in which trees were detected at the voltage shown out of eight identical samples tested for each composition, i.e., 4×20 indicates the presence of trees in four of eight samples under 20 kv. stress.

TABLE 1.—POLYETHYLENE BASED COMPOSITIONS CURED AT 320° F.

| Composition number | 1 | 2 | 3 | 4 | 5 | 6 |
|---|---|---|---|---|---|---|
| Base, Polyethylene HFDB 4201 (parts by weight) | 100 | 100 | 100 | 100 | 100 | 100 |
| Organic peroxide (2–3 parts by weight included in base), di(alpha-cumyl)peroxide | | | | | (¹) | |
| Divinylbenzene (parts by weight) | | | ² 3.625 | ³ 3.625 | | ² 2.0 |
| High voltage stabilizing additive (parts by weight): | | | | | | |
| Aromatic oil, CD–101 ⁴ | | 2.0 | 2.0 | 2.0 | 2.0 | 2.0 |
| Diphenylamine | | 0.25 | 0.25 | 0.25 | 0.25 | 0.25 |
| 2,4-dinitrotoluene | | 0.25 | 0.25 | 0.25 | 0.25 | 0.25 |
| Stress modulus, p.s.i. (100% elongation, 121° C.): | | | | | | |
| 5 minute cure | 14.3 | 2.2 | 8.8 | 4.4 | 3.3 | |
| 10 minute cure | 24.3 | 6.6 | 22.1 | 24.3 | 8.8 | 6.6 |
| 20 minute cure | 30.9 | 8.8 | 27.6 | 27.6 | 15.4 | 17.6 |
| Dielectric strength, number of failures out of 8 samples×voltage (kv.) | 4×20 | | 1×40 | 1×40 | 3×50 | 6×50 |

¹ Extra 1.25 parts added.
² As received.
³ Washed.
⁴ CD–101 is an aromatic oil sold by the Baron Oil Company. The high voltage stabilizer was added to the polyethylene base as a solution of diphenylamine and 2,4-dinitrotoluene in CD–101.

As shown in Table 1, composition 2 containing a high voltage stabilizing additive but no divinyl benzene had a relatively slow rate of cure, whereas compositions 3 and 4 containing divinyl benzene exhibited substantially the same rate of cure as composition 1 containing only polyethylene and di(alpha-cumyl) peroxide. Generally a stress modulus of at least 22 p.s.i. at 100 percent elongation and 121° C. is considered to indicate that an effective degree of cross-linking has occurred. Composition 5, which did not contain divinyl benzene but rather included excess di(alpha-cumyl) peroxide, exhibited a somewhat improved rate of cure over composition 2 but this was still less than the rate of cure of the compositions containing divinyl benzene, i.e., compositions 3, 4 and 6. The needle test data demonstrate that the enhanced voltage stability of the polyethylene and additive systems is not adversely affected by the presence of divinylbenzene.

EXAMPLES 7–16

The test procedure of Examples 1–6 was repeated using a second group of compositions having additives as indicated in Table 2 to the same polyethylene base as that used in Examples 1–6.

The above demonstrates that the compositions of this invention are applicable to various high voltage stabilizing additives and combinations thereof. In most cases in which divinyl benzene is added to a voltage stabilized polyethylene and organic peroxide mixture, the rate of cure shows

TABLE 2.—POLYETHYLENE BASED COMPOSITIONS CURED AT 320° F.

| Composition number | 7 | 8 | 9 | 10 | 11 | 12 | 13 | 14 | 15 | 16 |
|---|---|---|---|---|---|---|---|---|---|---|
| Base, Polyethylene HFDB 4201 (parts by weight) | 100 | 100 | 100 | 100 | 100 | 100 | 100 | 100 | 100 | 100 |
| Organic peroxide, 2–3 parts by weight included in base | | | | | | | | | | |
| Divinylbenzene, as received (parts by weight) | | 0.5 | 1.0 | 1.5 | | | | | | |
| Divinylbenzene, washed (parts by weight) | | | | | 0.5 | 1.0 | 1.5 | | | |
| Dicyclopentadiene (parts by weight) | | | | | | | | 1 | 2 | 3 |
| High voltage stabilizing additive (parts by weight): | | | | | | | | | | |
|   Aromatic oil, CD-101 | | 2 | 2 | 2 | 2 | 2 | 2 | 2 | 2 | 2 |
|   Diphenylamine | | .25 | .25 | .25 | .25 | .25 | .25 | .25 | .25 | .25 |
|   2,4-dinitrotoluene | | .25 | .25 | .25 | .25 | .25 | .25 | .25 | .25 | .25 |
| Stress modulus, p.s.i. (100% elongation, 121° C.): | | | | | | | | | | |
|   5 minute cure | 6.6 | 4.4 | 4.4 | 4.4 | 4.4 | 4.4 | 4.4 | 4.4 | 3.3 | 3.3 |
|   10 minute cure | 16.5 | 9.9 | 11.0 | 13.2 | 11.0 | 12.1 | 16.5 | 11.0 | 5.5 | 6.6 |
|   20 minute cure | 26.5 | 16.5 | 19.9 | 24.3 | 17.6 | 21.0 | 26.5 | 13.2 | 11.0 | 8.8 |
| Dielectric strength, number of failures out of 8 samples × voltage (kv.) | 7×20 | 4×40 | 1×50 | 3×50 | 1×50 | 5×50 | 6×40 | 1×40 | 8×40 | 5×40 |

From the above data, it is apparent that increasing the amount of divinyl benzene increases the rate of cure. A comparison of compositions 8–13 with compositions 14–16 demonstrates that the advantages exhibited by the addition of divinyl benzene are not duplicated by the substitution therefor of similar unsaturated hydrocarbons such as dicyclopentadiene. In Table 2 above, divinyl benzene "as received" and "washed" are shown. The "as received" indicates the presence of a stabilizer, para-tertiary butyl catechol in the amount of 1000 parts per million. "Washed" indicates that the above stabilizer has been removed. There appears to be no advantage to removing the stabilizer from the divinyl benzene. In all examples divinyl benzene 55 is used—a 55 percent solution marketed by Dow Chemical Company.

marked improvement; in all cases some improvement is shown.

EXAMPLES 33–42

The test procedure of Examples 1–6 was repeated using polyethylene DFDA 6506NT, an insulating grade of polyethylene sold by Union Carbide, to which was added peroxides S890, an organic peroxide sold by the Hercules Company, and Luperco 130XL, a di-functional unsaturated organic peroxide sold by Wallace & Tiernan. The chemical formula of Luperco 130XL is 2,5-bis(tertiary butyl peroxy)-2,5-dimethylhexyne-3. The compositions shown in Examples 33–42 were cured at 350° F., otherwise all testing was as explained above with reference to Examples 1–6. The compositions tested and results thereof are shown in Table 4.

TABLE 4.—POLYETHYLENE BASED COMPOSITIONS CURED AT 350° F.

| Composition number | 33 | 34 | 35 | 36 | 37 | 38 | 39 | 40 | 41 | 42 |
|---|---|---|---|---|---|---|---|---|---|---|
| Base, Polyethylene DFDA-6506-NT (parts by weight) | 100 | 100 | 100 | 100 | 100 | 100 | 100 | 100 | 100 | 100 |
| Organic peroxide (parts by weight): | | | | | | | | | | |
|   S 890 | 3 | 3 | 3 | 3 | 3 | 3 | 3 | 3 | | |
|   Luperco 130 XL | | | | | | | | | 3 | 3 |
| Divinylbenzene (parts by weight) | | | | 2.0 | 2.0 | | 2.0 | 2.0 | | 2.0 |
| High voltage stabilizing additive (parts by weight): | | | | | | | | | | |
|   Aromatic oil, CD-101 | | | | | 2.0 | | 2.0 | | | |
|   Orthonitrotoluene | | | 0.25 | | | | | | | |
|   2,4-dinitrotoluene | | | | | 0.25 | 0.25 | 0.25 | | | |
|   Diphenylamine | | | 0.25 | | | | | | | |
|   Benzoguanamine | | | | 0.25 | 0.25 | 0.25 | | | | |
|   2-nitrodiphenylamine | | | | | | | | 0.50 | 0.25 | 0.25 |
| Stress modulus, p.s.i. (100% elongation at 121° C.): | | | | | | | | | | |
|   2½ minute cure | | 2.6 | | 20.2 | 10.6 | 1.0 | 24.4 | 20.9 | | 20.1 |
|   5 minute cure | 92 | 26.4 | 20.8 | | | 19.1 | | | 10.9 | 35.8 |
|   10 minute cure | 120 | 75.2 | 36.4 | 70.3 | 55.9 | 52.7 | 87.4 | 79.3 | 25.0 | 52.3 |

EXAMPLES 17–32

The test procedures of Examples 1–6 were repeated using the compositions shown in Table 3.

EXAMPLES 43–54

The test procedure of Examples 1–6 was repeated using the compositions shown in Table 5 using different poly-

TABLE 3.—POLYETHYLENE BASED COMPOSITIONS CURED AT 320° F.

| Composition number | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| Base, Polyethylene HFDB-4201 (parts by weight) | 100 | 100 | 100 | 100 | 100 | 100 | 100 | 100 | 100 | 100 | 100 | 100 | 100 | 100 | 100 | 100 |
| Organic peroxide (2–3 parts by weight included in base) | | | | | | | | | | | | | | | | |
| Divinylbenzene (parts by weight) | | 2.0 | 2.0 | | | 2.0 | 2.0 | | | 2.0 | 2.0 | | 2.10 | | | 2.0 |
| High voltage stabilizing additive (parts by weight): | | | | | | | | | | | | | | | | |
|   Aromatic oil, CD-101 | | 2.0 | | 2.0 | | 2.0 | | 2.0 | | 2.0 | | 2.0 | 2.0 | 2.0 | 2.0 | 2.0 |
|   Diphenylamine | 0.5 | 0.5 | 0.5 | 0.5 | | | | | | | | | | | | |
|   2,4-dinitrotoluene | | | | | 0.5 | 0.5 | 0.5 | 0.5 | | | | | | | 0.25 | 0.25 |
|   Orthonitrotoluene | | | | | | | | | 0.5 | 0.5 | 0.5 | 0.5 | 0.25 | 0.25 | | |
|   Benzoguanamine | | | | | | | | | | | | | 0.25 | 0.25 | 0.25 | 0.25 |
| Stress modulus, p.s.i. (100% elongation at 121° C.): | | | | | | | | | | | | | | | | |
|   5 minute cure | 0 | 0 | 4 | .7 | | | | | 0 | 0 | 5.5 | 2.2 | 1.1 | 1.1 | 0 | 0 |
|   10 minute cure | .7 | 0 | 10 | 6.4 | | 1.4 | 0 | 1.1 | 1.1 | 15.4 | 5.7 | 2.2 | 10.3 | 1.1 | 0 | |
|   20 minute cure | 5.8 | 2.4 | 17 | 12.1 | 5.2 | 0 | 6.1 | 2.3 | 4.5 | 3.4 | 25.6 | 12.2 | 3.4 | 18.2 | 4.4 | 5.6 |
| Dielectric strength, number of failures out of 8 samples × voltage (kv.) | 2×40 | 0×40 | 3×40 | 1×40 | 2×40 | 4×40 | 3×40 | 6×40 | 4×40 | 4×40 | 4×40 | 2×40 | 6×40 | 4×40 | 5×40 | 3×40 | olefin base materials including: (a) Petrothene XL3517, a carbon filled cross-linkable polyethylene compound containing di(alpha-cumyl) peroxide sold by U.S. Industrial Chemicals Co.; (b) Polycure 504, a filled cross-linkable polyethylene compound containing di(alpha-cumyl) peroxide sold by Cooke Color and Chemical Company; (c) a mixture of Petrothene XL3517 and HFDB4201; (d) Petrothene XL3512, a neutral colored mineral filled cross-linkable polyethylene compound containing di(alpha-cumyl) peroxide sold by U.S. Industrial Chemicals Co.; and (e) HE071, a carbon filled high density polyethylene compound sold by Hercules Chemical Corp. The compositions were cured at 320° F. (HE071 based compositions were cured at 350° F.) and tested as described in Examples 1–6 to determine the stress modulus at 100 percent elongation and 300° F. The results are shown in Table 5.

made using a mineral filled low density polyethylene base containing 2½ to 3 percent of di(alpha-cumyl) peroxide. The compositions were mixed and cured by immersion in liquid at 450° F. Samples were tested for stress modulus in liquid at 100 percent elongation and 121° C. The test results are shown in Table 7.

TABLE 7.—POLYETHYLENE BASED COMPOSITIONS CURED IN LIQUID AT 450° F.

| Composition number | 60 | 61 |
|---|---|---|
| Base, mineral filled polyethylene (parts by weight) | 100 | 100 |
| Organic peroxide (2–3 parts by weight included in base) | | |
| Divinylbenzene (parts by weight) | | 3 |
| Stress modulus, p.s.i. (100% elongation at 121° C.): | | |
| 0.5 minute cure | 11 | 29 |
| 1.0 minute cure | 22 | 48 |
| 1.5 minute cure | 35 | 58 |
| 2.0 minute cure | 48 | 67 |

TABLE 5.—POLYETHYLENE BASED COMPOSITIONS

| Composition number | 43 | 44 | 45 | 46 | 47 | 48 | 49 | 50 | 51 | 52 | 53 | 54 |
|---|---|---|---|---|---|---|---|---|---|---|---|---|
| Base polyethylene (parts by weight): | | | | | | | | | | | | |
| Petrothene XL 3517 | 100 | 100 | | | 75 | 75 | | | | | | |
| Polycure 504 | | | 100 | 100 | | | | | | | | |
| HFDB4201 | | | | | 25 | 25 | | | | | | |
| HE 071 | | | | | | | 100 | 100 | | | | |
| Petrothene XL3512 | | | | | | | | | 100 | 100 | 100 | 100 |
| Organic peroxide (parts by weight): | | | | | | | | | | | | |
| Di(alpha-cumyl) peroxide included in base | Yes | Yes | Yes | Yes | Yes | Yes | Yes | Yes | | | | |
| Luperco 130 XL | | | | | | | | | 3 | 3 | 3 | 3 |
| Divinylbenzene (parts by weight) | | 3 | | 3 | | 3 | | 3 | | 2 | | 2 |
| High voltage stabilizing additive (parts by weight): | | | | | | | | | | | | |
| Aromatic oil, CD-101 | | | | | | | | | | | 2 | 2 |
| Diphenylamine | | | | | | | | | | | 1 | 1 |
| Cure temperature, °F | 320 | 320 | 320 | 320 | 320 | 320 | 320 | 320 | 350 | 350 | 350 | 350 |
| Stress modulus, p.s.i. (100% elongation at 300° F.): | | | | | | | | | | | | |
| 2½ minute cure | | | | | | | | | 11.3 | 40.5 | 5.7 | 13.1 |
| 5 minute cure | | | | | | | | | 16.0 | 47.7 | 12.3 | 20.2 |
| 10 minute cure | 125 | 154 | 34 | 64 | 60 | 114 | 58 | 80 | 29.8 | 112 | 10.5 | 25.1 |
| 20 minute cure | 144 | 156+ | 65 | 85 | 131 | 132 | 85 | 101 | | | | |
| 40 minute cure | 150 | | 80 | 104 | 139 | 144 | 96 | 128 | | | | |

EXAMPLES 55–59

In order to demonstrate the utility of our invention under production conditions, 5 compositions were prepared as shown in Table 6 using polyethylene base HFDB 4201. These compositions were extruded onto wire and cured in steam under actual production conditions at 400° F. and 225 p.s.i.g. for comparable periods of about 1½ to 2 minutes. Samples of the cured polyethylene were cut from the wire and tested to determine the stress modulus at 100 percent elongation and 121° C. in a liquid medium. Samples were also cut from the wire and tested according to the IPCEA heat distortion test which measures the degree of cross-linking as a function of heat distortion, a 20 percent distortion being considered maximum for satisfactory cross-linking. The results of these tests are shown in Table 6.

It is of particular importance that the compositions of our invention exhibit a relatively high initial rate of cure sufficient to reach an acceptable degree of cross-linking in a relatively short time period as compared to similar cross-linking compositions which do not contain divinyl benzene. For example, comparing the data of Table 7, it will be seen that composition 61 reaches an acceptable stress modulus in less than ½ minute, whereas composition 60, which does not have divinyl benzene, does not reach an acceptable stress modulus until a full one minute cure. Similarly, a comparison of Examples 41 and 42 in Table 4 indicates the high initial cure achievable using the compositions of our invention.

In the compositions of our invention, divinyl benzene may be added in amounts of .2 to 20 parts by weight per 100 parts by weight of polyolefin base. A preferred

TABLE 6.—POLYETHYLENE BASED COMPOSITIONS CURED IN STEAM AT 400° F.

| Composition number | 55 | 56 | 57 | 58 | 59 |
|---|---|---|---|---|---|
| Base, Polyethylene HFDB 4201 (parts by weight) | 100 | 100 | 100 | 100 | 100 |
| Organic peroxide, (2–3 parts by weight of di(alpha-cumyl) peroxide included in base) | | | | | |
| Divinylbenzene (parts by weight) | | 2 | 2 | 2 | |
| High voltage stabilizing additive (parts by weight): | | | | | |
| Aromatic oil, CD-101 | | 2 | 2 | 2 | 2 |
| Polyhalogenated biphenyls, Arochlor 1260* | | | | | .5 |
| Diphenylamine | .25 | .25 | .25 | | |
| 2,4-dinitrotoluene | | .25 | .25 | | |
| Stress Modulus, p.s.i. (100% elongation at 121° C.) | 28 | 34 | 27.2 | 33.2 | 8.4 |
| I.P.C.E.A. heat distortion at 121° C. (percent) | 12.9 | 11.5 | | | 52 |

*Arochlor 1260 is a mixture of polychlorinated biphenyls.

EXAMPLES 60 AND 61

In order to demonstrate the liquid curing of compositions according to our invention, 2 compositions were range is about 1.5 to about 5 parts by weight of divinyl benzene per 100 parts by weight of polyolefin base. It is believed that divinyl benzene is most effective in this preferred range, additional divinyl benzene apparently acts as a plasticizer therefore offsetting the effect, upon the stress modulus of the compositions, of increased cross-linking.

The high voltage stabilizing additives which may be used in the compositions of our invention may be characterized as halogenated polycyclic aromatic compounds and substituted aromatic hydrocarbon compounds which are characterized by having an electron acceptor group and an electron donor group potentially hydrogen-bonded together by a reversibly transferable proton. Typical acceptor groups are radicals such as —$NO_2$, —CO, —CN, phenyl and polycyclic aryl and typical donor groups are amino, lower alkyl and fluoro radicals.

What is claimed is:

1. A composition containing a polyolefin selected from the group consisting of polyethylene, polypropylene, and ethylene propylene rubber, and 1–10 parts of an organic peroxide cross-linking agent, 0.2–20 parts of divinyl benzene and 0.1–10 parts of a high voltage stabilizing additive per 100 parts of polyolefin, said additive being selected from the group consisting of halogenated polycyclic aromatic compounds, 2,4,6-trinitrotoluene, 2,4-dinitrotoluene, 2,6-dinitrotoluene, 2-nitrodiphenylamine, 2,4-dinitrodiphenylamine, o-nitroanisole, o-nitrobiphenyl, 2-nitroaniline, anthranilonitrile, 1-fluoro-2-nitrobenzene, diparamethoxy diphenylamine, o-nitrotoluene, chloranil and 2,6-dinitroaniline, mixtures thereof, mixtures thereof with diphenylamine or an aromatic oil and mixtures of diphenylamine with at least one of m-dinitrobenzene, m-nitroaniline, p-nitroaniline, m-nitrotoluene, p-nitrotoluene, o-nitrochlorobenzene, p-nitrochlorobenzene, o-nitroaniline, o-nitrotoluene and 2,4-dinitroaniline.

2. The composition according to claim 1 wherein the polyolefin is polyethylene and the organic peroxide is di(alpha-cumyl) peroxide.

References Cited

UNITED STATES PATENTS

| 2,943,075 | 6/1960 | Schweitzer | 260—45.9 |
| 3,054,766 | 9/1962 | Van Hook | 260—32.4 |
| 3,331,797 | 7/1967 | Kopetz et al. | 260—45.9 |
| 3,247,162 | 4/1966 | Newland et al. | 260—45.9 |
| 3,413,244 | 11/1968 | Landler | 260—878 |

FOREIGN PATENTS

| 908,224 | 10/1962 | Great Britain | 260—878 |

HOSEA E. TAYLOR, Primary Examiner

U.S. Cl. X.R.

260—45.7, 45.9, 94.9

UNITED STATES PATENT OFFICE
CERTIFICATE OF CORRECTION

Patent No. 3,632,680  Dated January 4, 1972

Inventor(s) George H. Hunt and Jonathan R. Learn

It is certified that error appears in the above-identified patent and that said Letters Patent are hereby corrected as shown below:

Table 3, line labelled "Divinylbenzene (parts by weight)", Column 30 should read --2.0-- instead of "2.10"

Table 4, line labelled "2,4-dinitrotoluene", Column 35 should read --0.25-- instead of being blank Table 4, line labelled "2,4-dinitrotoluene", Column 38 should be blank instead of "0.25"

Signed and sealed this 12th day of September 1972.

(SEAL)
Attest:

EDWARD M. FLETCHER, JR.
Attesting Officer

ROBERT GOTTSCHALK
Commissioner of Patents